(No Model.)
J. S. CAMPBELL.
FLEXIBLE SHAFT.
No. 449,068. Patented Mar. 24, 1891.
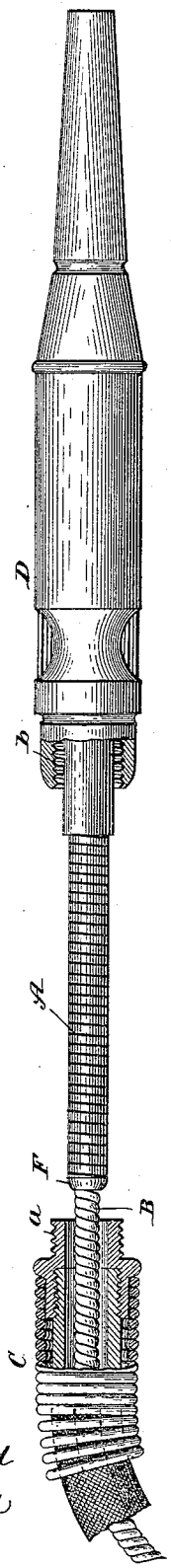
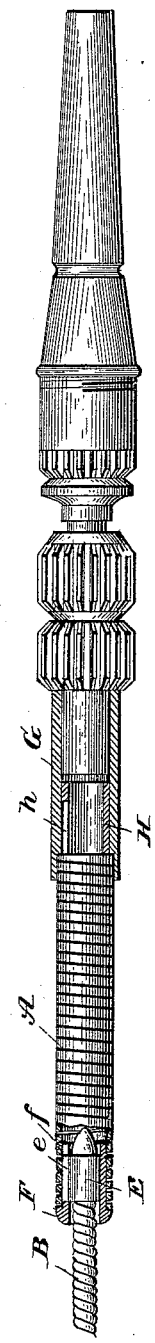
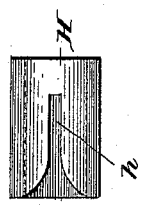
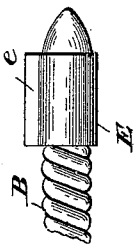
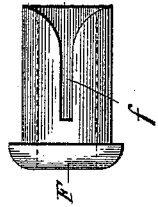
WITNESSES:
Edwin L. Bradford
W. Curtis Lammond
Jno. Smalley Campbell
INVENTOR
BY Wm C. W. Intire
ATTORNEY.

UNITED STATES PATENT OFFICE.

JOHN SMALLEY CAMPBELL, OF LONDON, ENGLAND, ASSIGNOR TO THE CARROLL ALUMINUM MANUFACTURING COMPANY, OF NEW YORK, N. Y.

FLEXIBLE SHAFT.

SPECIFICATION forming part of Letters Patent No. 449,068, dated March 24, 1891.

Application filed July 11, 1890. Serial No. 358,452. (No model.)

*To all whom it may concern:*

Be it known that I, JOHN SMALLEY CAMPBELL, a citizen of the United States, residing at London, England, have invented certain new and useful Improvements in Flexible Shafts for Dental Engines; and I do hereby declare the following to be a full, clear, and exact description of the invention, such as will enable others skilled in the art to which it appertains to make and use the same.

My invention relates to certain new and useful improvements in flexible shafting for dental engines, and particularly to the construction of such shafts at the juncture with the wrist-pieces usually employed to hold the tool to be operated by the said shaft.

It has for its object to render the shaft exceedingly flexible when desired, and permit of its being readily and expeditiously changed to a semi or less flexible condition.

In an application filed by me on the 5th day of November, 1889, Serial No. 329,347, I have shown and described details in the construction of flexible shafts designed to convert the shaft, at its juncture with the shaft of the driving-pulley, from a flexible to a rigid shaft, and this is accomplished through the medium of a slotted tube adapted to slide over the single-coil wire portion of the shaft and lock directly to the pulley-shaft and the stiffer portion of the elastic shaft.

In describing my present invention, which I will now proceed to do by reference to the accompanying drawings, I will refer to that portion of the shaft which is usually made excessively flexible as the "shaft," and to the remaining or stiffer portion as the "cable."

Figure 1 is a plan view, partially in section, of the wrist-connection or tool end of a flexible shaft and cable designed for use with a dental engine. Fig. 2 is a similar view with different parts shown in section. Fig. 3 is a plan view of the tubular head-piece of the "shaft." Fig. 4 is a detail plan view of the end of the cable designed to telescope with the shaft, and Fig. 5 is a plan view of a slotted sleeve adapted to fit within the tubular end of the wrist-piece.

Similar letters denote like parts in the several figures.

A is the flexible shafting, which is composed of coiled wire adapted to be readily bent in any direction and to any extent.

B is the cable, also composed of coiled wire, but so coiled as that by comparison with the shaft A its flexibility is limited.

C is the usual flexible covering designed to conceal and guard the shafting and cable at the working end, and D is an ordinary wrist-piece designed to hold the interchangeable tools.

The covering or guard C is connected to the wrist-piece through the medium of a male and female screw-thread $a$ $b$. The cable B is made of such diameter that it, together with its feathered end piece, may readily telescope within the shaft A. That end of the cable which is designed to enter the shaft A is secured to and confined within a short sleeve E, having upon one side an elongated feather $e$, and within the rear end of the coil-shaft A is securely fixed a tubular heading F, provided with a longitudinal slot $f$, designed to receive and interlock with the feather $e$ upon the sleeve E. The forward end of the coil-shaft A is securely affixed to the tool-holding shaft arranged within the wrist-piece D by a tubular connection G, and within the rear end of this tubular connection G is rigidly secured a sleeve-piece H, provided with a longitudinal slot $h$, adapted to receive the feather $e$ on the sleeve E. The parts F and H are arranged with their open ends or mouths toward each other, as shown clearly at Figs. 2, 3, and 5, and it will be seen that when the wrist-piece and coil-shaft are drawn forward or away from the cable B the feather $e$ will seat itself within and interlock with the slot $f$ in the tubular heading F, and that the rotary motion of the cable will be imparted to the tool-shaft in the wrist-piece D through the extremely flexible shafting A, so that the latter may be bent on a very short curve without interfering with the rotation of the tool, and when it is desired to drive the tool-shaft directly by the rotating cable B the latter is telescoped within the coil-shaft, whereupon the feather $e$ on the sleeve E will enter the interlocking slot $h$ of the sleeve-piece H, and as the shaft A will then have the cable B lying within it the flexibility of said shaft will be no greater than that of the interiorly-arranged cable B. This arrangement is very desirable in dental engines, for at certain times great flexibility of the shaft adjacent to the wrist-piece is essentially necessary, and at all other times, when such extreme flexibility is not necessary, it is very desirable to relieve the coil-connection or flexible shafting from the wearing strain to which it is subjected when rotated directly by the cable B.

What I claim as new, and desire to secure by Letters Patent, is—

1. A driving-shaft for dental engines, consisting of the coil-shaft A and flexible cable B, the cable B telescoping within the coil-shaft A and adapted to be locked at one end with the coil-shaft or with the tool-holder shaft, substantially as and for the purpose set forth.

2. The coil-shaft A, fixed at one end to the interiorly-arranged and slotted tubular heading F and at the opposite end to the slotted tubular connection G of the wrist-piece D, in combination with the cable B, provided with the feathered sleeve E, substantially as and for the purpose set forth.

In testimony whereof I affix my signature in presence of two witnesses.

JOHN SMALLEY CAMPBELL.

Witnesses:
E. EVERETT ELLIS,
W. H. BARNES.